US012613635B1

(12) United States Patent　　(10) Patent No.:　US 12,613,635 B1
Masuda et al.　　(45) Date of Patent:　Apr. 28, 2026

(54) NARROWING REPOSITION SEARCH AREA IN A TAPE DIRECTORY REGION

(71) Applicant: International Business Machines Corporation, Armonk, NY (US)

(72) Inventors: Setsuko Masuda, Toshima-ku (JP); Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 19/022,721

(22) Filed: Jan. 15, 2025

(51) Int. Cl.
　　*G06F 3/06*　　　　(2006.01)
(52) U.S. Cl.
　　CPC .......... *G06F 3/0611* (2013.01); *G06F 3/0629* (2013.01); *G06F 3/0644* (2013.01); *G06F 3/0682* (2013.01); *G06F 3/0686* (2013.01)
(58) Field of Classification Search
　　CPC .... G06F 3/0611; G06F 3/0629; G06F 3/0644; G06F 3/0682; G06F 3/0686
　　USPC ......................................... 711/111
　　See application file for complete search history.

(56) References Cited

U.S. PATENT DOCUMENTS

| | | |
|---|---|---|
| 11,437,062 B1 | 9/2022 | Miyamura et al. |
| 11,437,070 B1 | 9/2022 | Miyamura et al. |
| 11,635,914 B2 | 4/2023 | Miyamura et al. |
| 11,688,431 B2 * | 6/2023 | Miyamura ........... G11B 27/328 711/111 |
| 12,020,731 B1 * | 6/2024 | Miyamura ............ G06F 3/0682 |
| 12,190,910 B1 * | 1/2025 | Masuda ........... G11B 20/10388 |
| 2019/0371364 A1 | 12/2019 | Hasegawa et al. |
| 2022/0035563 A1 * | 2/2022 | Miyamura ............. G11B 27/34 |
| 2022/0164110 A1 * | 5/2022 | Abe ...................... G06F 3/0644 |

FOREIGN PATENT DOCUMENTS

| | | |
|---|---|---|
| JP | 2001-282462 A | 10/2001 |
| JP | 2001-283575 A | 10/2001 |
| JP | 2004-095072 A | 3/2004 |

OTHER PUBLICATIONS

Zhang et al., "HPTFS: A High-Performance Tape File System", 2006, 11 pages, https://www.semanticscholar.org/paper/HPTFS%3A-High-performance-tape-file-system-Zhang-Du/5792bec3f5f8499561ce25f832381e2787328be0.

* cited by examiner

*Primary Examiner* — Than Nguyen
(74) *Attorney, Agent, or Firm* — Zilka Kotab, PC

(57)　　　　ABSTRACT

In one general embodiment, a method includes narrowing down a number of data sets to be searched in an HRTD (High Resolution Tape Directory) area for a target record based at least in part on a ratio of: a number of records from a beginning of the HRTD area to the target record, and a total number of records in the HRTD area having the target record. A physical position range in the HRTD area where the narrowed number of data sets physically exist is calculated based on a linear density of a tape drive specification. A magnetic tape having the HRTD area is repositioned to a starting data set in the calculated physical position range. The narrowed range of data sets is read starting at the starting data set.

20 Claims, 17 Drawing Sheets

100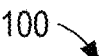

CLIENT COMPUTER  101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

REPOSITIONING CODE

200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

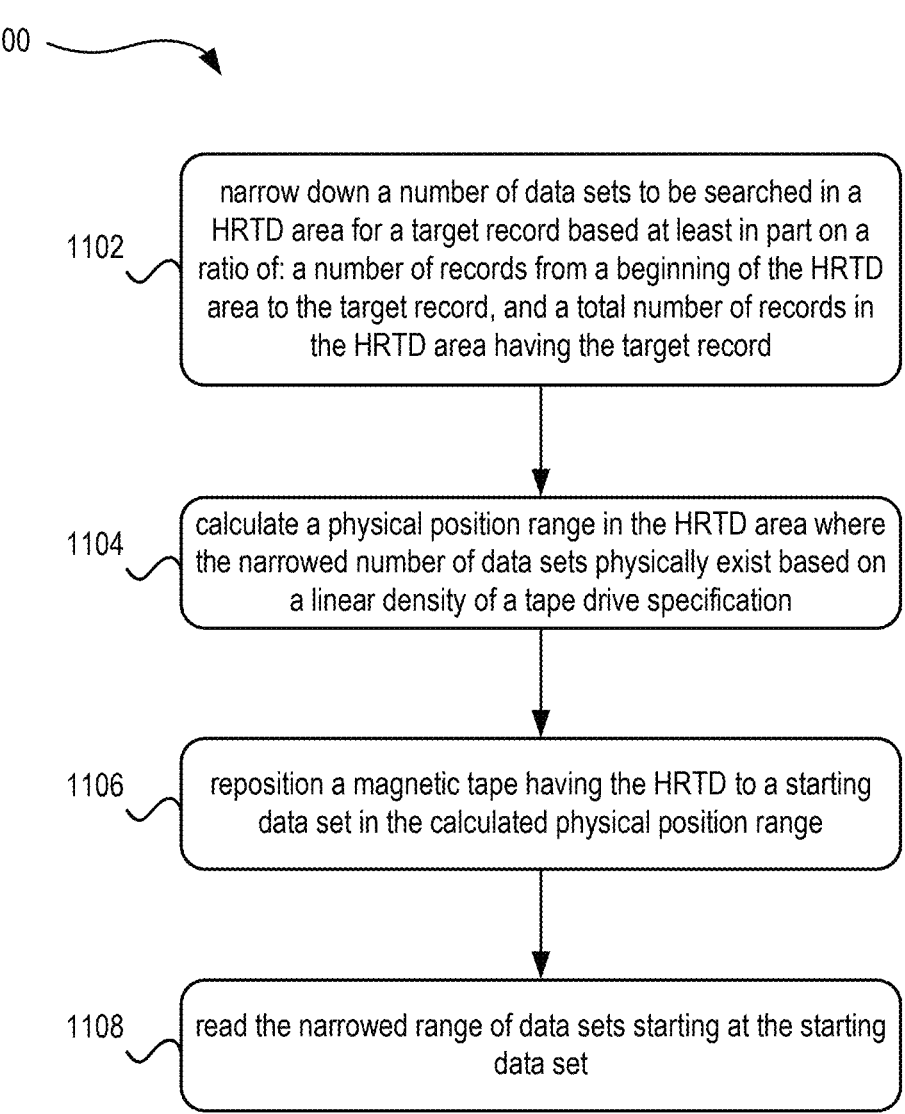

1102 — narrow down a number of data sets to be searched in a HRTD area for a target record based at least in part on a ratio of: a number of records from a beginning of the HRTD area to the target record, and a total number of records in the HRTD area having the target record 1104 — calculate a physical position range in the HRTD area where the narrowed number of data sets physically exist based on a linear density of a tape drive specification 1106 — reposition a magnetic tape having the HRTD to a starting data set in the calculated physical position range 1108 — read the narrowed range of data sets starting at the starting data set

- - - - (1) Read from HRTD
———— (2) Reposition w/o skimming
— · — · (3) Reposition+skimming
· · · · · · · (4) Read from HRTD w/ an ERP

NARROWING REPOSITION SEARCH AREA IN A TAPE DIRECTORY REGION

BACKGROUND

The present invention relates to tape-based data storage systems, and more particularly, this invention relates to searching for data on magnetic recording tape.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

SUMMARY

A method, in accordance with one embodiment, includes narrowing down a number of data sets to be searched in an HRTD (High Resolution Tape Directory) area for a target record based at least in part on a ratio of: a number of records from a beginning of the HRTD area to the target record, and a total number of records in the HRTD area having the target record. A physical position range in the HRTD area where the narrowed number of data sets physically exist is calculated based on a linear density of a tape drive specification. A magnetic tape having the HRTD area is repositioned to a starting data set in the calculated physical position range. The narrowed range of data sets is read starting at the starting data set.

A computer program product, in accordance with one embodiment, includes one or more computer readable storage media, and program instructions stored on the one or more storage media to perform operations comprising the foregoing method.

An apparatus, in accordance with one embodiment, includes a controller configured to perform operations comprising: narrowing down a number of data sets to be searched in an HRTD (High Resolution Tape Directory) area for a target record based at least in part on a ratio of: a number of records from a beginning of the HRTD area to the target record, and a total number of records in the HRTD area having the target record, calculating a physical position range in the HRTD area where the narrowed number of data sets physically exist based on a linear density of a tape drive specification, repositioning a magnetic tape having the HRTD area to a starting data set in the calculated physical position range, and reading the narrowed range of data sets starting at the starting data set. The apparatus also includes a drive mechanism for passing the tape over a magnetic head.

Various ones of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head; a storage library; a host coupled to a tape drive; etc.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 11 is a flowchart of a method, in accordance with one embodiment.

DETAILED DESCRIPTION

Figure 2A:
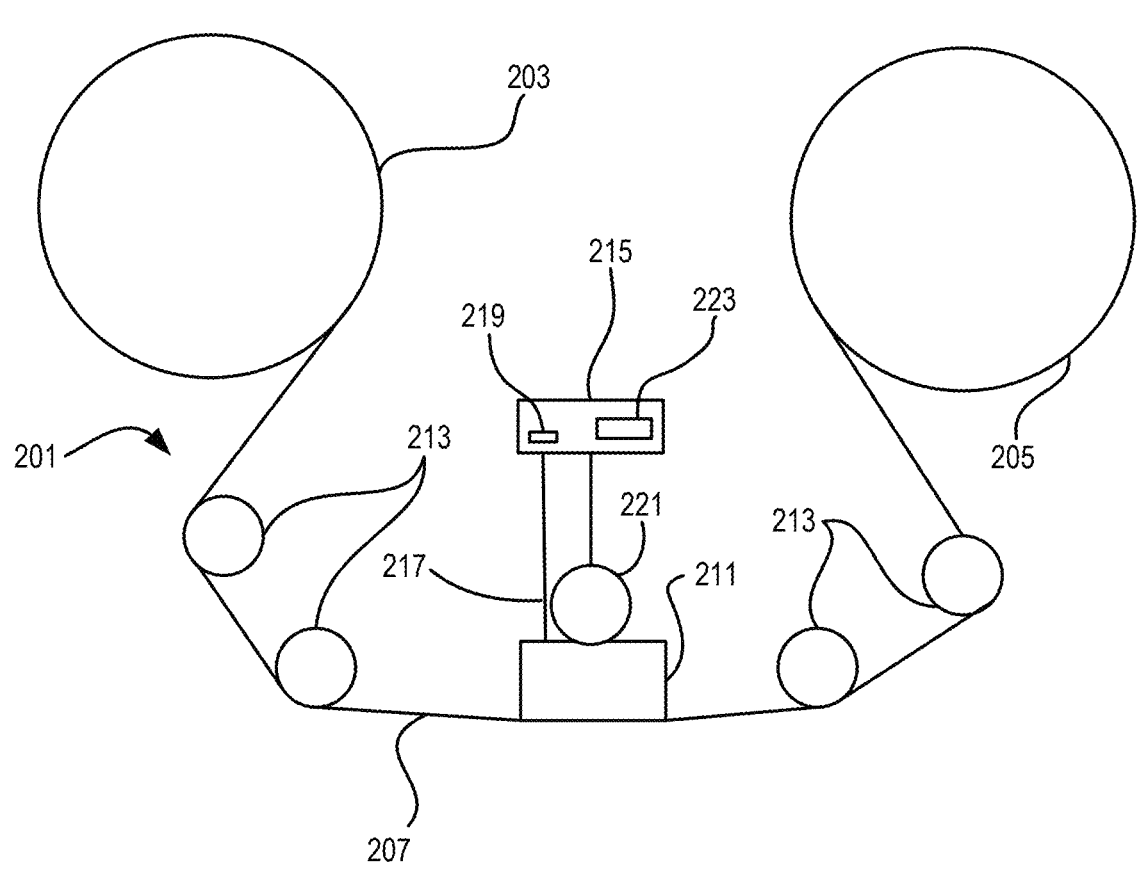
FIG. 2A is a schematic diagram of a simplified tape drive system, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Particularly, the following description discusses techniques for faster repositioning to desired data on magnetic recording tape media.

In one general embodiment, a method includes narrowing down a number of data sets to be searched in an HRTD (High Resolution Tape Directory) area for a target record based at least in part on a ratio of: a number of records from a beginning of the HRTD area to the target record, and a total number of records in the HRTD area having the target record. A physical position range in the HRTD area where the narrowed number of data sets physically exist is calculated based on a linear density of a tape drive specification. A magnetic tape having the HRTD area is repositioned to a starting data set in the calculated physical position range. The narrowed range of data sets is read starting at the starting data set.

In another general embodiment, a computer program product includes one or more computer readable storage media, and program instructions stored on the one or more storage media to perform operations comprising the foregoing method.

In another general embodiment, an apparatus includes a controller configured to perform operations comprising: narrowing down a number of data sets to be searched in an HRTD (High Resolution Tape Directory) area for a target record based at least in part on a ratio of: a number of records from a beginning of the HRTD area to the target record, and a total number of records in the HRTD area having the target record, calculating a physical position range in the HRTD area where the narrowed number of data sets physically exist based on a linear density of a tape drive specification, repositioning a magnetic tape having the HRTD area to a starting data set in the calculated physical position range, and reading the narrowed range of data sets starting at the starting data set. The apparatus also includes a drive mechanism for passing the tape over a magnetic head.

Exemplary Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as repositioning code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Exemplary Tape Drive Apparatus and Tape Media Configurations and Operation

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read transducers (also referred to as readers), write transducers (also known in the art as writers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various embodiments. The controller 215 may be coupled to a memory 219 of any known type, which may store instructions executable by the controller 215. Moreover, the controller 215 may be configured and/or programmable to perform or control some or all of the methodology presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
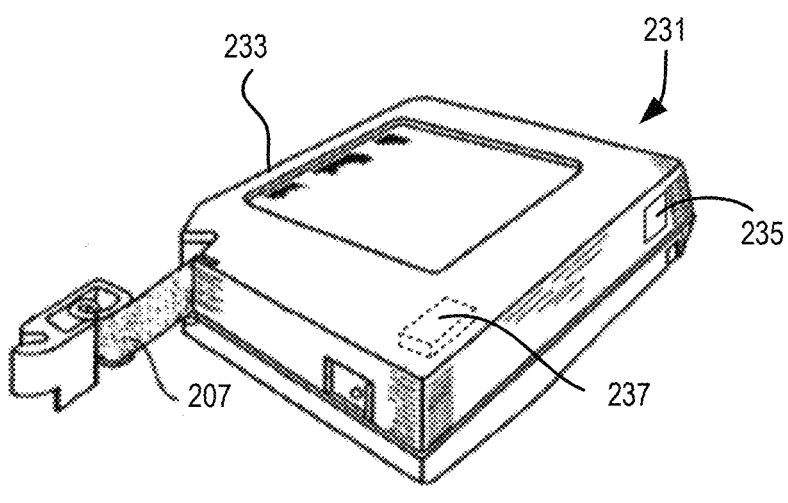
FIG. 2B is a schematic diagram of a tape cartridge, in accordance with one embodiment.

FIG. 2B illustrates an exemplary tape cartridge 231 according to one embodiment. Such tape cartridge 231 may be used with a system such as that shown in FIG. 2A. As shown, the tape cartridge 231 includes a housing 233, a tape 207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred embodiment, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
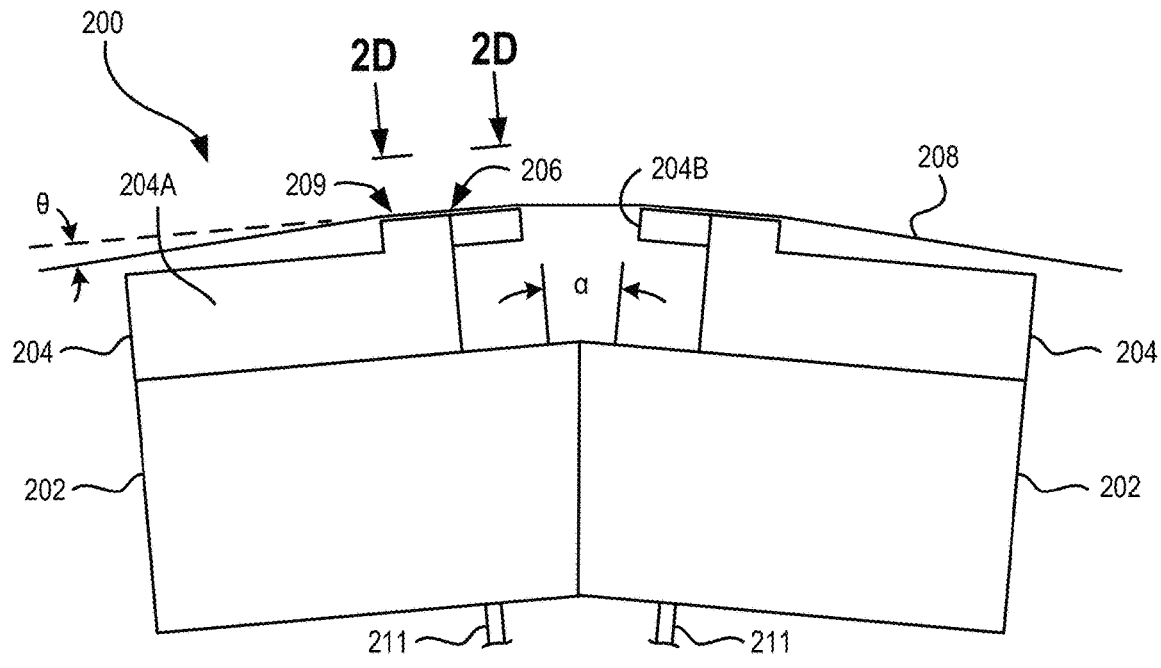
FIG. 2C illustrates a side view of a flat-lapped, bi-directional, two-module magnetic tape head, in accordance with one embodiment.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle $\alpha$ with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle $\theta$ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the transducers 206 of each of the modules 204. Pads on a cable 217 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2D:
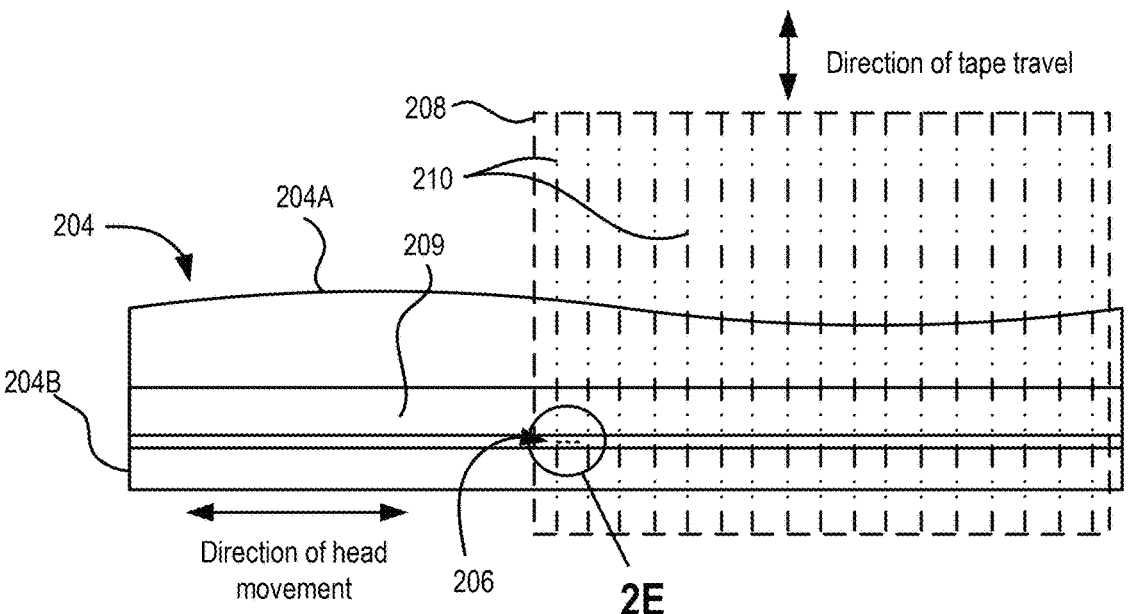
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2E:
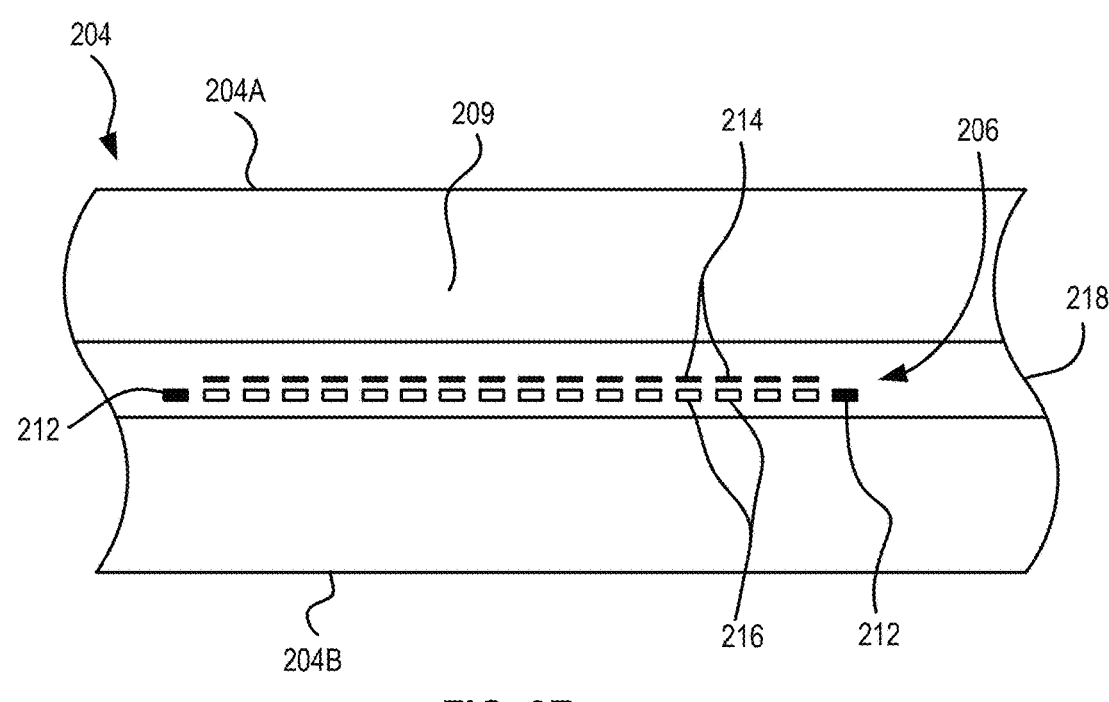
FIG. 2E is a detailed view taken from Circle 2E of FIG. 2D.

FIG. 2E depicts a plurality of read transducers and/or write transducers 206 formed in a gap 218 on the module 204 in Circle 2E of FIG. 2D. As shown in FIG. 2E, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2E, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2C and 2D-2E together, each module 204 may include a complementary set of read transducers and/or write transducers 206 for such things as bi-directional reading and writing, read-while-write capability, backward compatibility, etc.

Figure 2F:
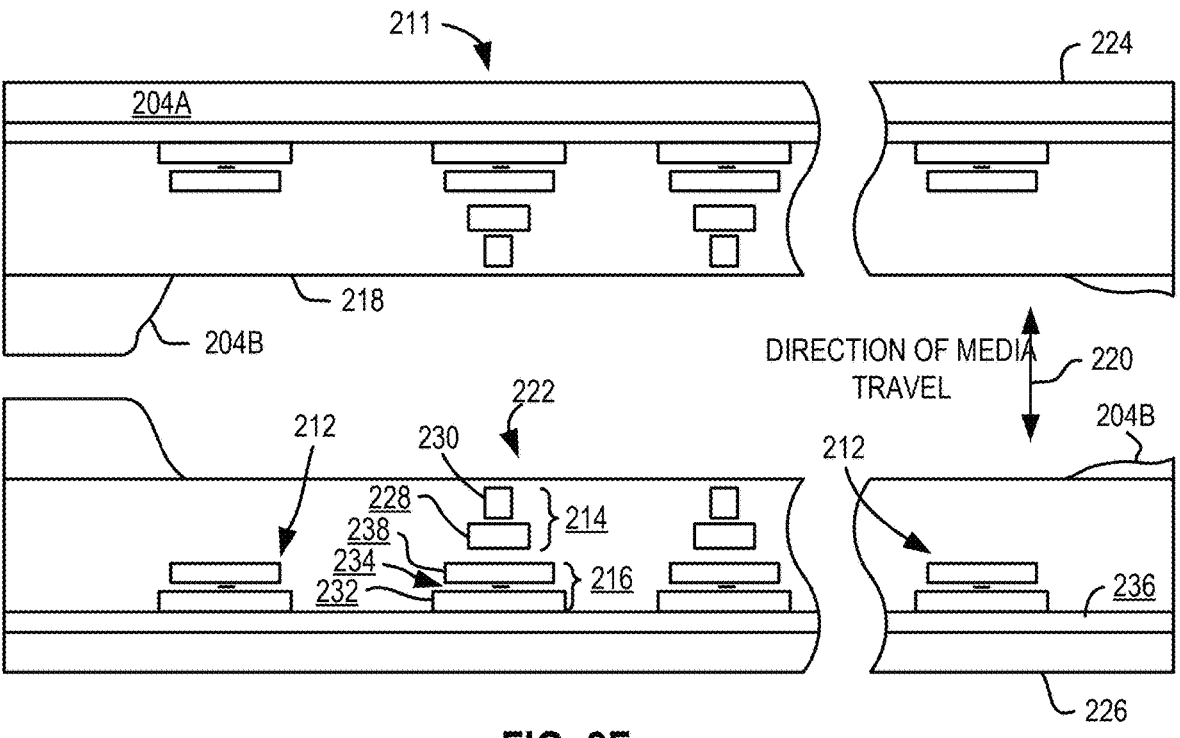
FIG. 2F is a detailed view of a partial tape bearing surface of a pair of modules.

FIG. 2F shows a partial tape bearing surface view of complementary modules of a magnetic tape head 211 according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
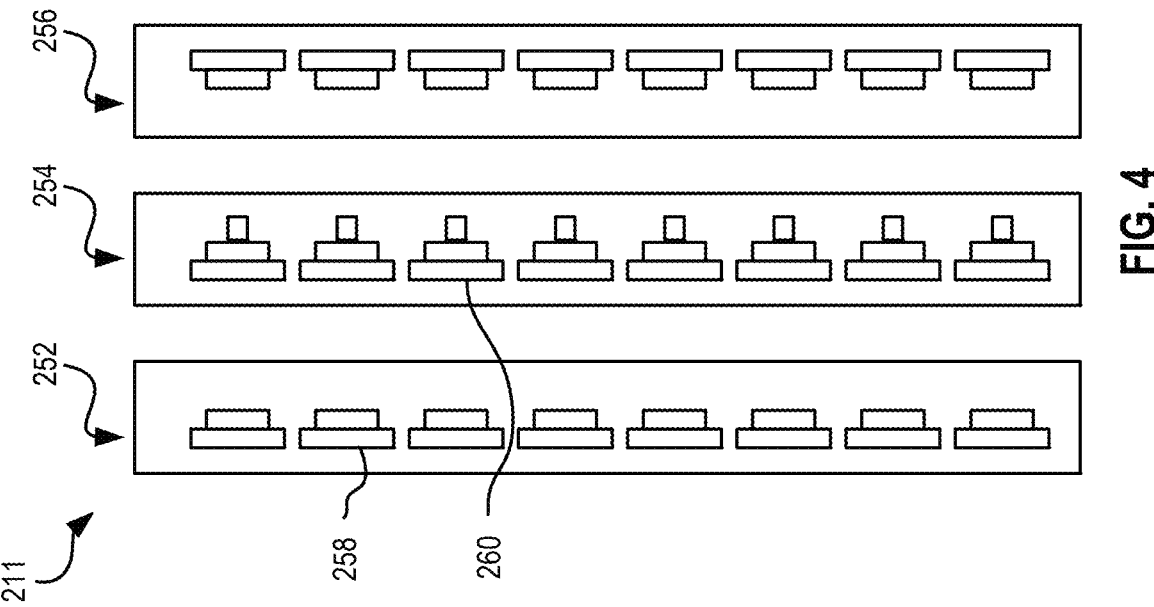
FIG. 4 is a partial tape bearing surface view of a magnetic head having a read-write-read configuration, in accordance with one embodiment.
Figure 3:
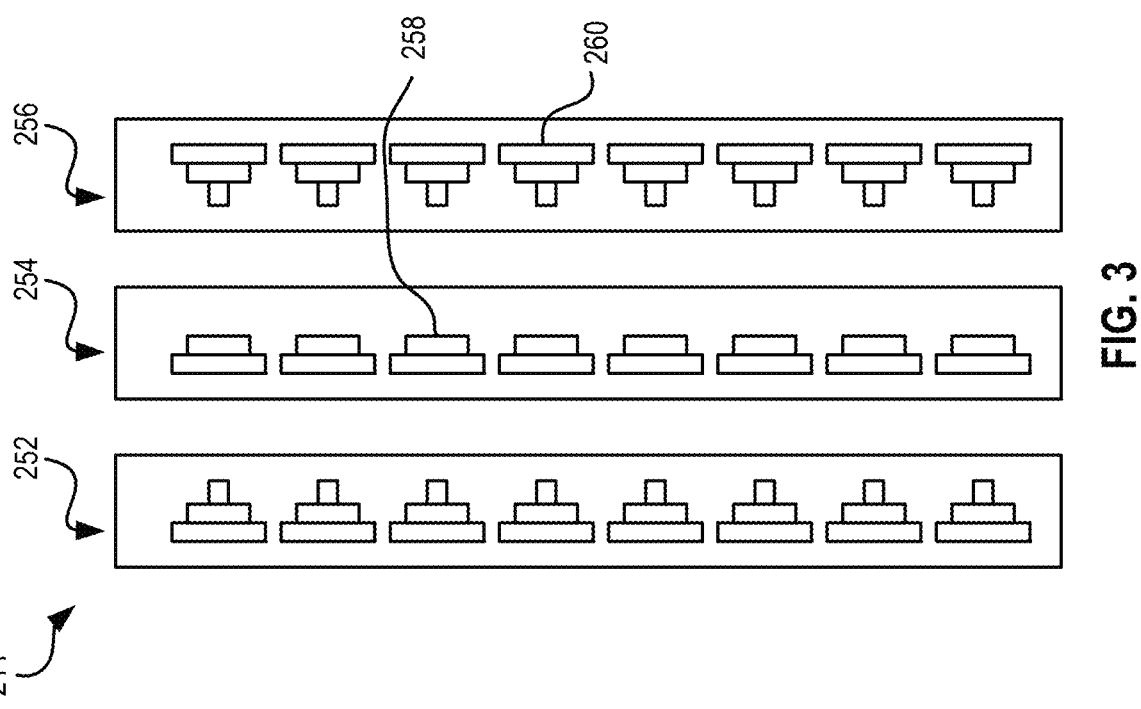
FIG. 3 is a partial tape bearing surface view of a magnetic head having a write-read-write configuration, in accordance with one embodiment.

The configuration of the tape head 211 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
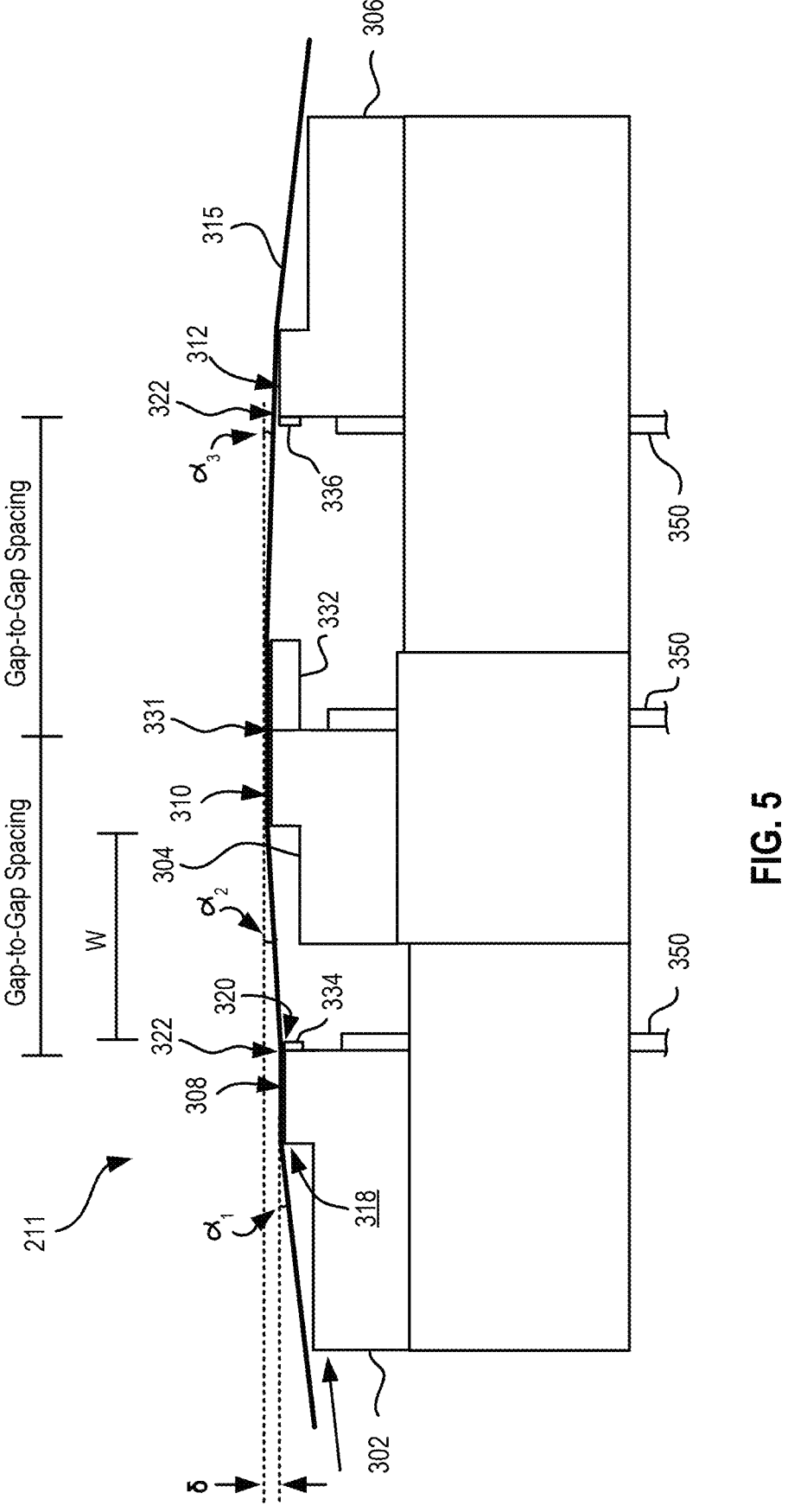
FIG. 5 is a side view of a magnetic tape head with three modules according to one embodiment where the modules all generally lie along about parallel planes, in accordance with one embodiment.

FIG. 5 illustrates a magnetic head 211 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing." The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
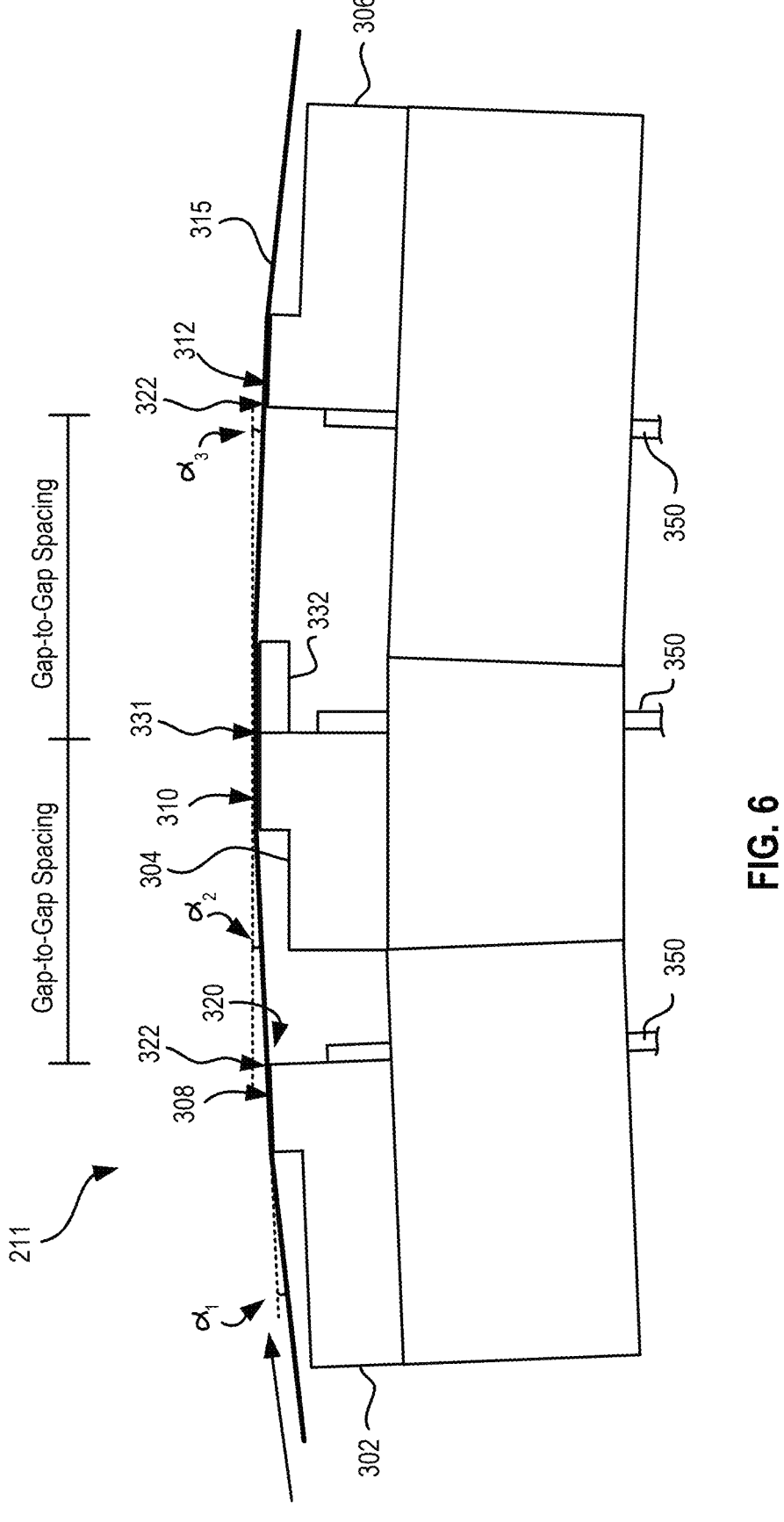
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
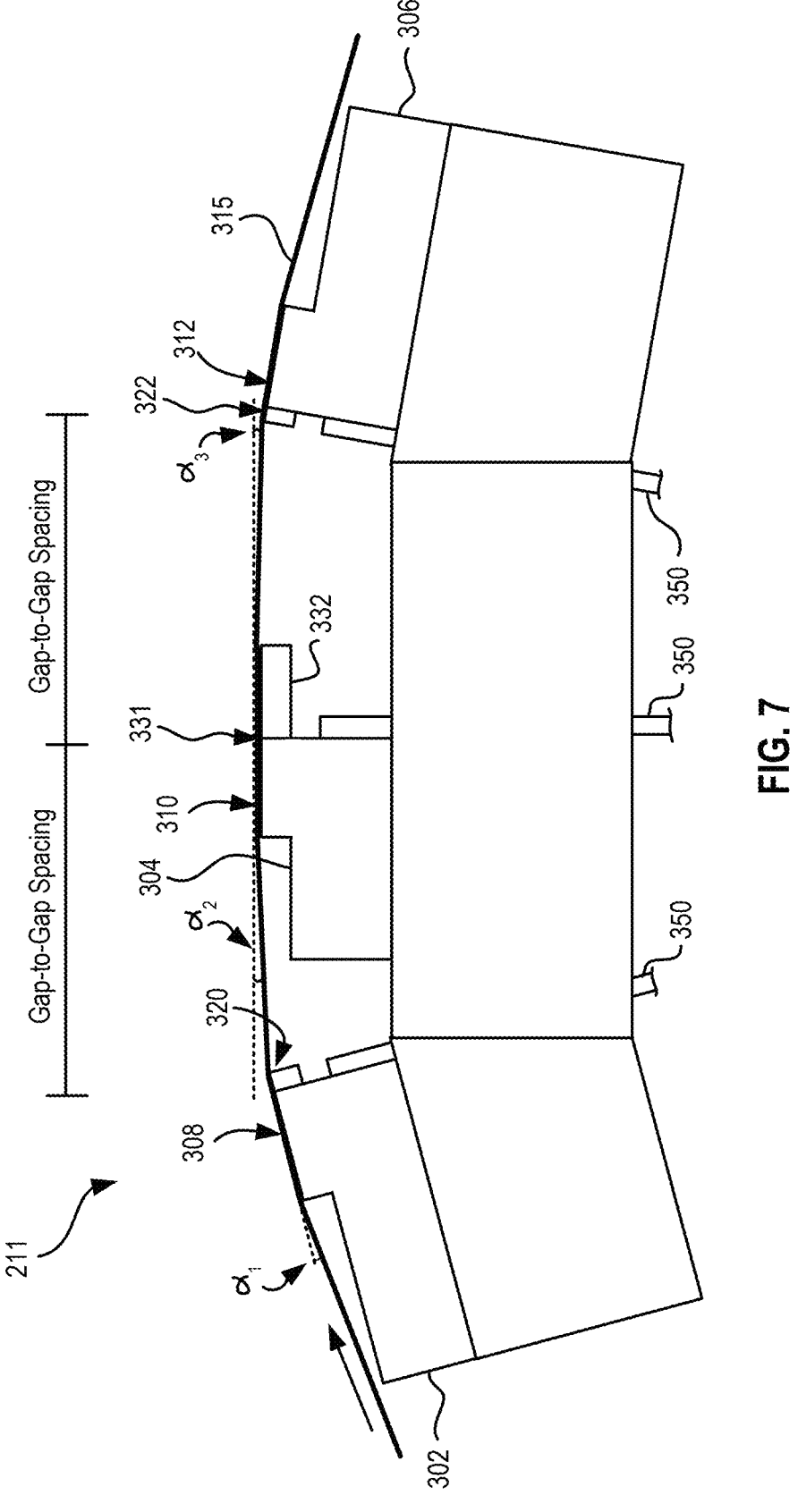
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 211 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
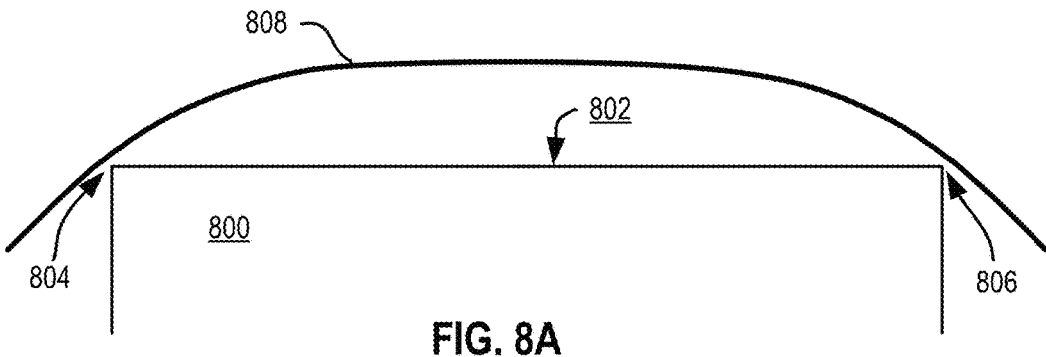
FIGS. 8A-8C are schematics depicting the principles of tape tenting.
Figure 8B:
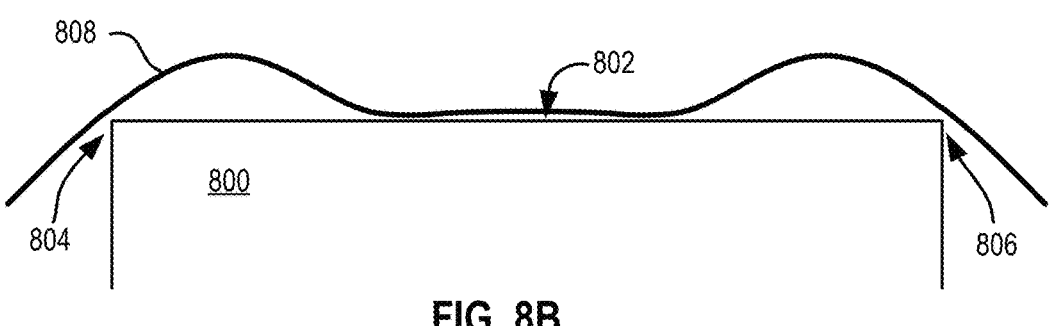
Figure 8C:
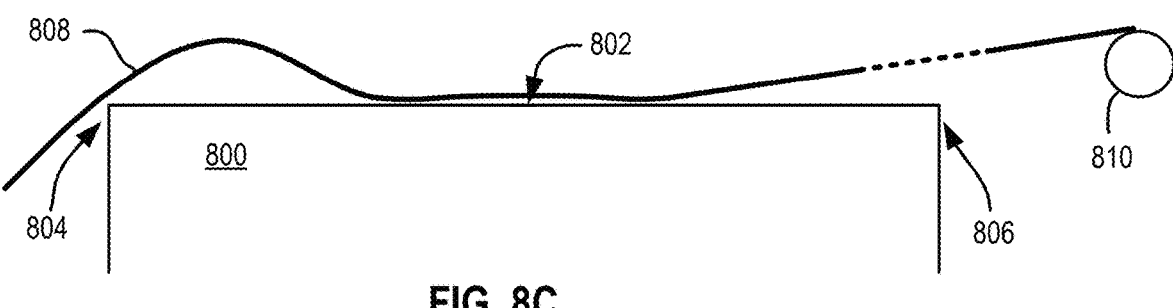

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 205 of FIG. 2A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
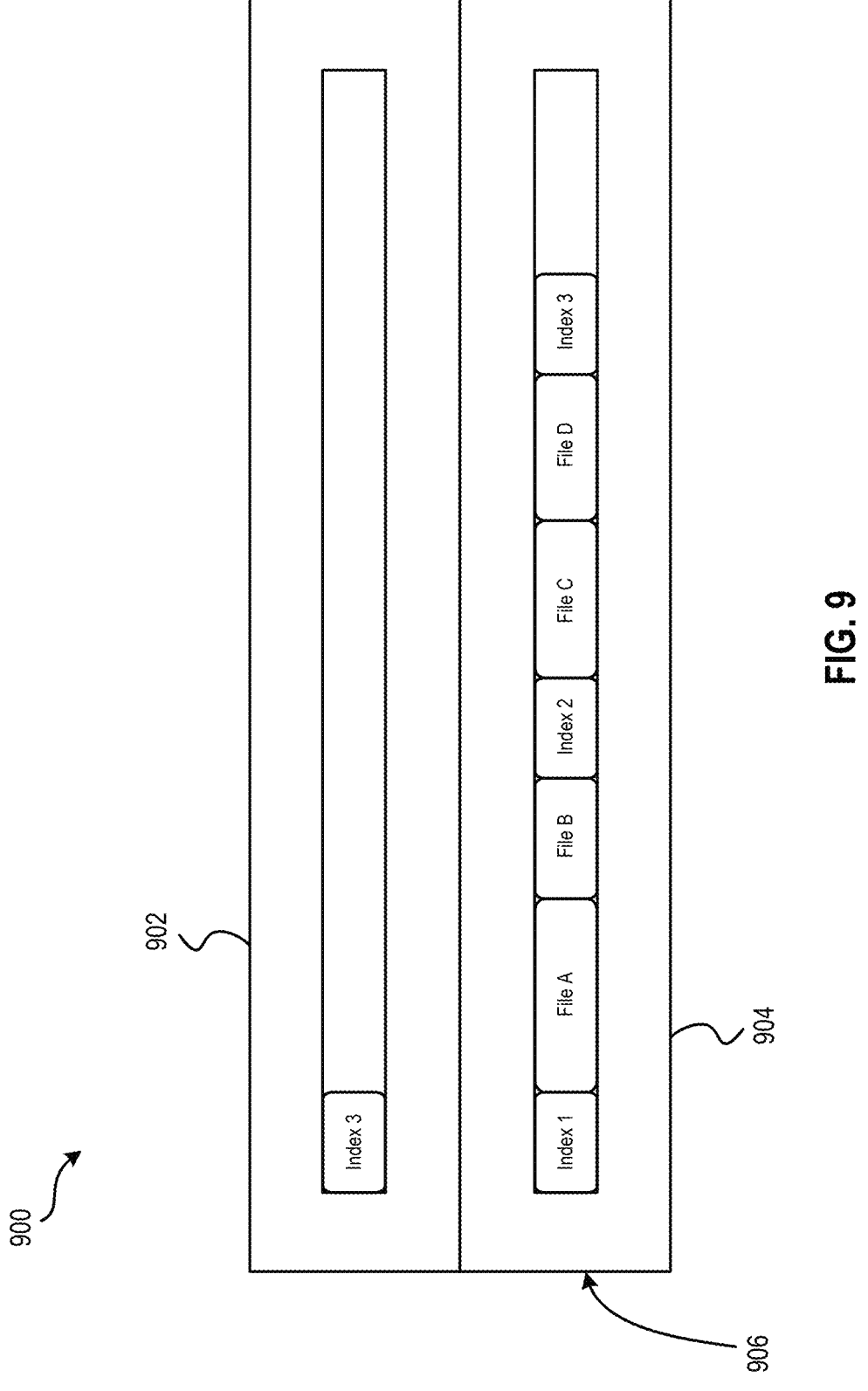
FIG. 9 is a representational diagram of files and indexes stored on a magnetic tape, in accordance with one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition

904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Example of Writing Data by Tape Drive

Figure 10:
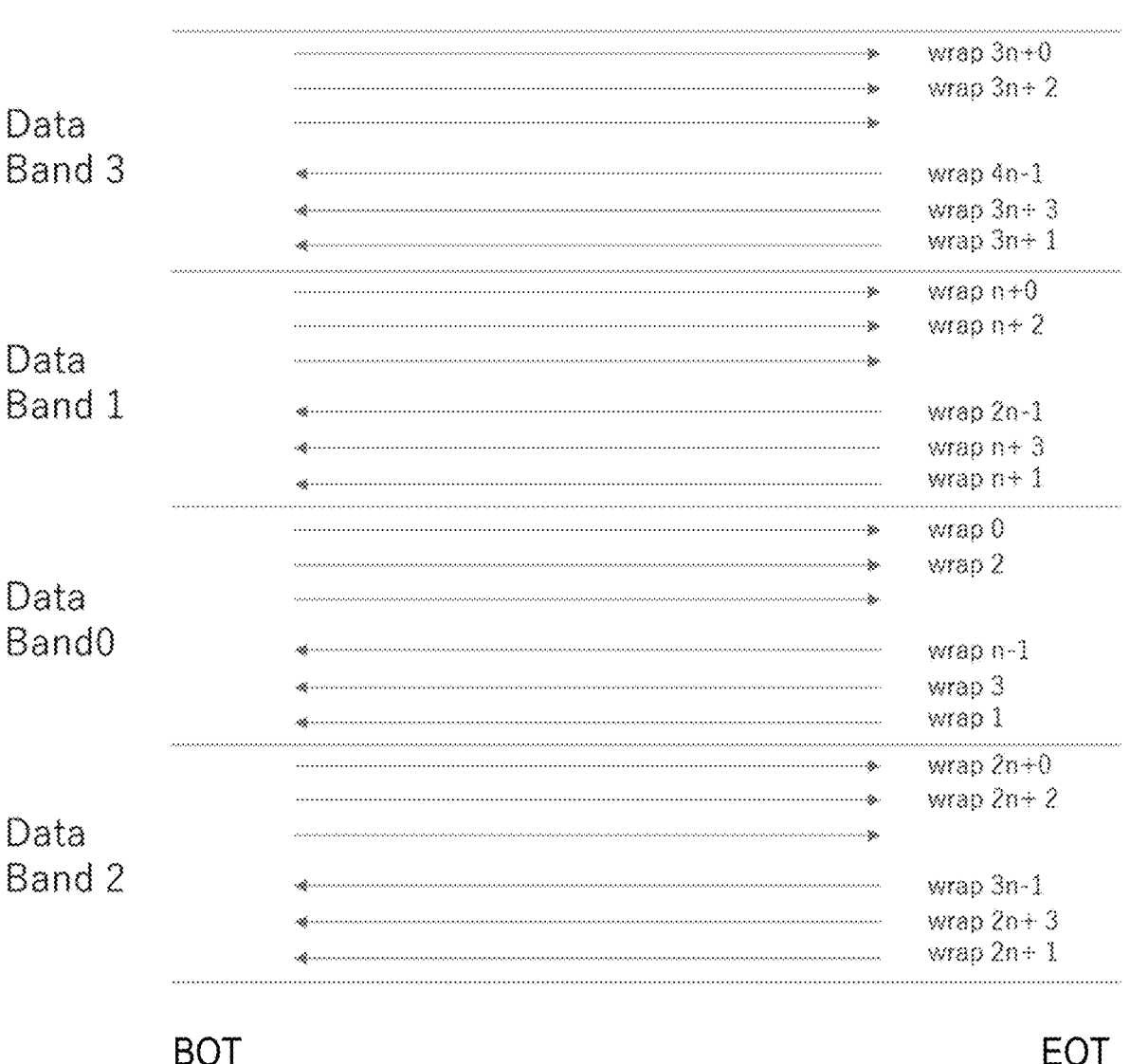
FIG. 10 is a conceptual drawing of wraps written in data bands on a magnetic recording tape.

As noted above, data is written onto tape linearly from the beginning of the tape to the end of the tape, or from the end of the tape to the beginning of the tape, along wrap regions. The data area width of each track on a wrap, as measured in the tape width direction, is often referred to as track pitch (Wtp). As shown in the FIG. 10, the tape drive writes data in tracks running along the even wraps from the beginning of the tape (BOT) to the end of the tape (EOT) in what is commonly referred to as the forward direction. Similarly, the drive writes data in tracks along the odd wraps from the EOT to the BOT, in what is commonly referred to as the backward direction.

Hundreds of wraps may be written on a tape. For example, the TS1170 tape drive from International Business Machines Corporation currently writes 592 wraps on a single tape.

The user data records which were written by the host computer are assembled into data sets which are recorded from beginning of the wrap to the end of the wrap. A part of each data set may include a Data Set Information Table (DSIT), which stores the information of this data set, e.g., in a conventional manner.

Exemplary Information Recorded in Header

A data set, in one approach, is structured from more than 10,000 CWI-4 of conventional type, which are also known as fragments. The header of the CWI-4 may be processed by an ASIC mounted on the tape drive, and information for determining whether the CWI-4 is included in the data set to be read is recorded. Since the header of CWI-4 has only a limited size, e.g., 12 bytes, minimum information is recorded, For example, conventional information such as Data Set ID Fragment, Wrap Toggle, Write Pass, etc. may be recorded in the header. Data Set ID Fragment is a CWI-4 header that has a high possibility of being the target data set compared to the data set number to be read because the lower-order bits of the ID (4 bytes) of this data set are recorded. Wrap Toggle ensures that the data is not accidentally picked up from another wrap by recording the low order bits of the wrap number in which the data set is recorded. Write Pass is an ID having a number that increases sequentially from 1 when data is written after the tape is shipped. It is incremented by 1 when overwriting an old data set or when starting to write to a new wrap, thereby being usable to determine if the read CWI-4 is the latest read.

The tape drive writes a Codeword Object (CO) which includes a two CWI-4 set to each writer head. In some approaches, more than 10000 CWI-4s are in a data set. A pair of CWI-4s is called CO, of which there may exist more than 5000 in a data set. In some approaches, the tape drive is configured to perform data operations on 32 tracks simultaneously. One CO is written per track. The first 32 COs are written to the tape simultaneously on 32 tracks. The operation to write 32 COs simultaneously from 32 tracks continues until all 5000 COs in a data set are written to the tape.

Skimming

Skimming may also be performed. Skimming is a process for confirming that a data set having a specific Write Pass or Data Set ID Fragment exists in the area to be read. When traveling within a specific range, only the CWI-4 header information may be extracted to confirm that the specified data is included. If the specified data is included, the data can be read.

Example of Locating Target Data Position

Upon receiving a request from a host to read or write data, the tape drive needs to locate the target data position. For example, upon receiving a request to read data, the tape drive moves to the target data position on the tape having the data. Similarly, when the host requests to write new data to the tape, the tape drive moves to the proper position and writes the new data from there, overwriting any data found after that target data position. The process to move to the target data location is called repositioning.

The reposition request is conventionally made by using the record number or the file mark number. The file mark is a delimiter of each file on the tape, which may contain multiple records. The tape drive does not know at which location the record or the file mark are physically written on the tape. The tape drive utilizes a mechanism of Tape Directory (TD) to identify the approximate target record location. In one approach, the TD divides a wrap into two regions and records the number of records and file marks recorded in the region.

As noted above, one popular type of tape drive is based on Linear Tape Open (LTO), and is compliant with LTO standards. IBM manufactures additional types of drives such as the TS11xx series, which has been uniquely developed to meet IBM customer requirements. LTO tape drives currently store tape directory information per every half wrap.

The TS1160 tape drive supports a tape directory which divides a wrap into 128 regions; this is called a High Resolution Tape Directory (HRTD), which is stored in addition to the TD. The HRTD of the TS1160 has 272 wraps×128 regions per wrap=34816 regions. Each region of an HRTD store the last record number and the last file mark number of the previous region, and the number of records and file marks written in the region.

In one example of one entry of an illustrative HRTD, the following information is recorded in 32 bytes.

Flag . . . 1 byte
Data Set ID . . . 3 bytes
LPOS . . . 4 bytes
Tape Write Pass . . . 4 bytes
Total Record Count . . . 6 bytes
Total File Mark Count . . . 6 bytes
Record Count . . . 4 bytes
File Mark Count . . . 4 bytes LTO tape drives utilize what is often referred to as a Virtual High Resolution Tape Directory (vHRTD), which divides a wrap into several regions (currently 32 regions) to store similar information as the aforementioned HRTD, in addition to TD information.

For simplicity, the term "HRTD" will be used herein to refer to any and/or all of: the aforementioned HRTD, the aforementioned vHRTD, any known directory for storing information about data sets in a more granular form than in the aforementioned TD, or any conceivable similar technique that would become apparent to one skilled in the art after reading the present disclosure.

Once a tape drive, e.g., TS11xx or LTO drive, that has already retrieved the HRTD receives a reposition request, the drive identifies the region that includes the target record or file mark using the HRTD. When the tape drive receives a reposition request from the host, it identifies the region where the designated record or file mark is written. Because the physical location of the region can be determined, the tape drive reads data sets one by one from the data set at the begin boundary of the region to the end and checks whether the target record or file mark is written in the data set. The reposition process completes when the target record or file mark is found in the data set; but if it is not found in the data set, the drive keeps reading the next data set.

An LTO tape drive may utilize only the TD until it reads the vHRTD from the end of data (EOD). In this case, the drive may estimate the rough location from the proportion of the target record number or file mark between the first and last record number or file mark of the TD regions. In some approaches, the range may correspond to some length of tape or approximate portion of a wrap, e.g., about a half-length of a wrap (which may be about 500 m for some tapes), one-quarter length of a wrap, a full wrap, etc. The drive starts reading data sets from the position several meters before the targe data sets being sought.

Tape write pass (WP) is a sequence number of ascending order to distinguish whether the data on tape is new or old. The same WP value is applied to a series of data sets which were written during sequential write attempts. The WP is incremented whenever new data overwrites old data (append), data is rewritten over the write failed data (Error Recovery Procedure (ERP)), or when turning to write a new wrap in the opposite direction at the end of a completed wrap. Because WP increments at wrap change, the WP becomes larger as the number of wraps increases.

Issues with Existing Repositioning Mechanisms

Tape drives can generally perform repositioning in a shorter time by utilizing the HRTD than they can using simply TD information. However, there are several issues with HRTD.

The length of an HRTD region may be lengthy, often exceeding several meters, e.g., >10 m. In one example, assuming a data set length of around 15 cm, up to 67 data sets can be written to a 10 m long HRTD region on tape. One of the fragments in a data set is a Data Set Information Table (DSIT), which contains the data set information such as the number of records or filemarks in the data set. During a reposition process, the tape drive moves the tape such that the head is positioned at the beginning of an HRTD region, and data sets are read one by one. Every time a DSIT in the data set is read, the tape drive checks whether the reposition target record or file mark is written in the data set or not. If the target is not written to the data set, the drive reads the next data set.

The tape drive may not always be able to read the data set in one read attempt for a variety of reasons, such as if the tape medium is worn out, the tape drive's heads are degraded, etc. If the target record or file mark is recorded in the last data set within the HRTD region, and errors are encountered during readback, the tape drive may need to perform read retries until the DSIT is read for all 67 data sets. It is typically inevitable to repeat at least some read retries when a tape drive attempts to read the data set which contains the target record or file mark. However, the data sets that the tape drive repeats read retries to read DSIT during repositioning may have nothing to do with the target. These unnecessary read retries cause excessive wear on the tape medium, leading to further problems with readback and wearing the tape out.

Solutions to the Foregoing Problems

Various aspects of the present invention overcome the aforementioned problems using one or both of the following two mechanisms to reduce unnecessary data set reads and read retries.

One mechanism narrows the number of data sets to read in an HRTD region using a target record number or file mark number. Another mechanism narrows the physical range within the HRTD region by eliminating areas where the target data set cannot exist. As a result of combining the two mechanism, the tape drive can realize both fast repositioning to data as well as protecting the media from wear.

Referring to FIG. 11, a flowchart of a method 1100 implementing these mechanisms is shown according to one embodiment. The method 1100 may be performed in accordance with the present invention in any of the environments depicted in FIGS. 1-10, among others, in various embodiments. Of course, more or fewer operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a tape drive, its controller, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

In operation 1102, a number of data sets to be searched in an HRTD (High Resolution Tape Directory) area (or equivalently, other type of area covered by a tape directory) for a target record is narrowed down based at least in part on a ratio of: a number of records from a beginning of the HRTD area to the target record, and a total number of records in the HRTD area having the target record.

Operation 1102 of narrowing down of the number of data sets to be searched in the HRTD area may, in some approaches, include calculating the data set numbers in which the target record is most likely to be recorded based on the record number, file mark number, and/or block number (record number+file mark number), the ratio of the record numbers recorded in the area where the target is determined to be recorded based on the HRTD and the area before it to the record number of the target, and the data set numbers of these HRTD areas. For example, the data set numbers may be used to compute the total number of data sets in the HRTD area, which may then be used to narrow down the number of data sets to be searched. See, e.g., $\{DS_{HRTD(n+1)}-D_{SHRTD(n)}\}$ in the Exemplary Embodiments section below.

The narrowing down of the number of data sets to be searched in the HRTD may further be based on a compression ratio of data written in the HRTD area. For example, when a data pattern with the lowest compression ratio comes after (or before) a data pattern with the highest compression ratio, the range in which the data pattern can be dispersed before or after the data pattern with the highest compression ratio within the HRTD is calculated. The data set numbers in which the target is most likely to be recorded are distributed to the center to define the physical position range. Reading may start from a data set of the beginning of the physical position range.

In operation 1104, a physical position range in the HRTD area where the narrowed number of data sets physically exist is calculated (e.g., estimated) based on a linear density of a tape drive specification.

In one approach, using the linear density specified in the tape drive specifications or the like, the range in the HRTD area in which the data set was not able to be written is calculated, which accordingly defines the portion of the HRTD where the data set was able to be written. In preferred approaches, reading begins within the HRTD area, outside the area where the data set was not able to be written, and at the location closest to the beginning of the HRTD area. Moreover, reading ends at the position within the HRTD area, outside the range in which the data set was not able to be written, and farthest from the beginning of the HRTD area.

In some approaches, in operation 1102, the data set number from which reading starts is determined to search for the data set in which the target record is recorded, and in operation 1104, the physical position range within the HRTD that locates the data set is calculated. When the Tape Write Pass of the data set has been determined, the tape drive begins reading the data set from the beginning position of the calculated range, e.g., with the first data set in the calculated physical position range as the starting data set. If the Tape Write Pass has not been determined, the tape drive performs skimming within the calculated range to determine the Tape Write Pass of the data set, and then starts reading the data sets at a starting data at a physical position determined by skimming.

In operation 1106, a magnetic tape having the HRTD is repositioned to the starting data set in the calculated physical position range.

In operation 1108, the narrowed range of data sets are read, starting at the starting data set, e.g., to search for the target record.

EXEMPLARY EMBODIMENTS

The following description provides exemplary approaches to implementing the method 1100 of FIG. 11. These embodiments are provided by way of example only, and should not be deemed to limit or require any particular feature.

Narrow Down the Number of Data Sets that the Drive Searches within an HRTD Range Based on the Target Record Number and/or File Mark Number As noted above, e.g., with reference to operation 1102 of FIG. 11, the data set number that the drive searches within an HRTD range may be narrowed down based on the target record number and/or file mark number.

Assume that the drive finds the target record number $R_{target}$ exists within a range between the border of nth HRTD region HRTD(n) and the border of the $n+1^{th}$ HRTD region HRTD(n+1). Here, the data set ID $DS_{HRTD(n)}$ and the record number $R_{HRTD(n)}$ crosses the HRTD(n)'s border. The data set ID $DS_{HRTD(n+1)}$ and the record number $R_{HRTD(n+1)}$ crosses the HRTD(n+1)'s border. In this case, the following formula holds true:

$$R_{HRTD(n)} < R_{target} \leq R_{HRTD(n+1)}$$

The record size is determined by the command option the host specifies. Normally, the application program which runs on the host server divides a file into the pre-defined block size and writes the divided records to the tape drive one by one. For example, the block size is 256 KB by default on Linear Tape File System (LTFS) or High-Performance Storage System (HPSS). The size of the last divided block of the file varies, but the size of the other records has the same block size. The average record size becomes close to the default block size. Here, assume that the record size can be fixed.

The data set $DS_{start}$ from which the tape drive starts to read to search the target record is determined by the following equation:

$$DS_{start} =$$

$$DS_{HRTD(n)} + \frac{R_{target} - R_{HRTD(n)}}{R_{HRTD(n+1)} - R_{HRTD(n)}} \times \{DS_{HRTD(n+1)} - DS_{HRTD(n)}\} - DS_{margin}$$

where:
- $DS_{start}$ is the starting data set,
- $DS_{HRTD(n)}$ is a first data set in the HRTD,
- $R_{target}$ is a number of the target record,
- $R_{HRTD(n)}$ is a first record number in the HRTD,
- $R_{HRTD(n+1)}$ is a first record number in a next HRTD,
- $DS_{HRTD(n+1)}$ is a first data set in the next HRTD, and
- $DS_{margin}$ is an adjustment factor based on a compression ratio of data written in the HRTD area.

In this exemplary formula, the search target is depicted only by the record number, for simplicity and ease of understanding. When the target is represented by a file mark number or a block number (or record number plus file mark number), the record number in the formula must be changed to a file mark number or a block number.

In the formula, $DS_{margin}$ is used to adjust the target location which is changed by the compression ratio of the written data type.

Calculation of $DS_{margin}$

Records written from the host are typically compressed by the compression engine in the tape drive before being written to tape. In some drives, the maximum compression ratio of data is about 2.5:1, but practical data is not usually compressed to that extent in such drives. For example, if data with a high compression ratio is written up to a certain position in the HRTD region and uncompressed data is written from the next position, or vice versa, uncompressed data is written up to a position where a high compression ratio is written from the next position, and there is a readout start position at the boundary position, there is the biggest difference between the data set number obtained by the ratio of the record number and the data set number in which the target record is written.

Since the effect of the compression ratio of the data is much greater than the effect of the difference in the record size at the end of the file, $DS_{margin}$ is calculated by focusing on the compression ratio below.

Figures 12, 13:
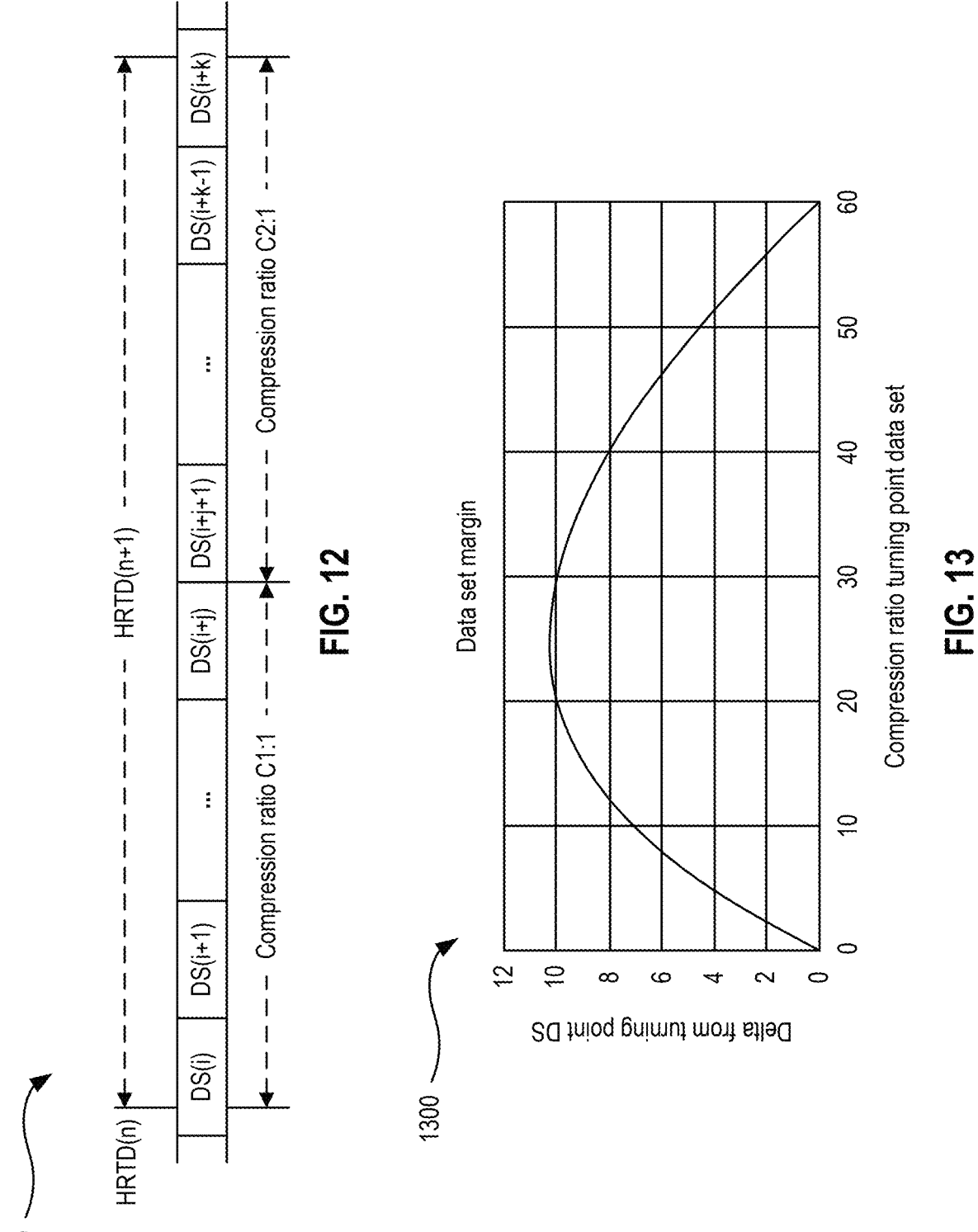
FIG. 12 is a graphical example of data compression ratio change in an HRTD area on tape, in accordance with one embodiment.
FIG. 13 is a chart depicting a data set margin for compression ratio transition from 2:1 to 1:1, in accordance with one embodiment.

An example 1200 of a case where DS is written from DS(i) to DS(i+k) in the HRTD(n+1) region, and the data compression ratio was changed from C1:1 in the DS(i) to C2:1 in the DS (i+j+1) is shown in FIG. 12.

As shown, there are j data sets with a compression ratio of C1:1 and k−j data sets with a compression ratio of C2:1. For simplicity, it is assumed that the compression ratio is switched at the separation of the data set. If m uncompressed records can be written in one data set, there are j×m×C1 records with a compression ratio of C1:1 in the HRTD(n+1) region and (k−j)×m×C2 records with a compression ratio of C2:1.

The record in which the compression ratio is switched is the j×m×C1$^{th}$ record of j×m×C1+(k−j)×m×C2 records, so when calculated by the ratio of the record number, $$s = \frac{j \times m \times C1}{j \times m \times C1 + (k - j) \times m \times C2} \times k$$

and the s-th data set ($DS_s$) is the starting position for the readout. However, this record is recorded in the $j^{th}$ data set. The difference between them is the $DS_{margin}$:

$$DS_{margin} = \frac{j \times m \times C1}{j \times m \times C1 + (k - j) \times m \times C2} \times k - j$$

If the ratio of the C1:1 data set in the HRTD domain is p (0≤p≤1), then j can be expressed as j=p×k. Also, if one assumes C1−C2=ΔC and the equation is rewritten, the following equation results.

$$DS_{margin} = \frac{\Delta C \times p \times (1 - p)}{C2 + \Delta C \times p} \times k$$

Using this formula, the $DS_{margin}$ can also be calculated by considering a worst case of maximum compression ratio, such as 2.5:1. However, since this is not always realistic, an example calculation assuming that the compression ratio changes from 2:1 to 1:1 is shown. However, this does not rule out the case of 2.5:1 (maximum) compression.

In one example, if 60 data sets are written in the HRTD domain, C1=2, C2=1, k=60 are substituted and organized, the following equation is obtained.

$$DS_{margin} = \frac{60 \times p(1 - p)}{60 + p}$$

When p is moved from 0 to 1, i.e., j is moved from 0 to 60, $DS_{margin}$ transits as shown in the chart 1300 FIG. 13.

When the compression ratio changes from 2:1 to 1:1 in the $24^{th}$ data set in the HRTD region, the $DS_{margin}$ is the largest, resulting in a deviation in the 10.19 data set. In other words, when the 34×m$^{th}$ record in the HRTD region is the target, the ratio is used to get the $34^{th}$ data set, but that record is actually recorded in the $24^{th}$ data set. This is the worst-case scenario, where the compression ratio switches from 2:1 to 1:1. In fact, if the drive reads from the data set 10 before the data set obtained by ratio to the data set 10 steps back, the target record is included in it.

Figure 14:
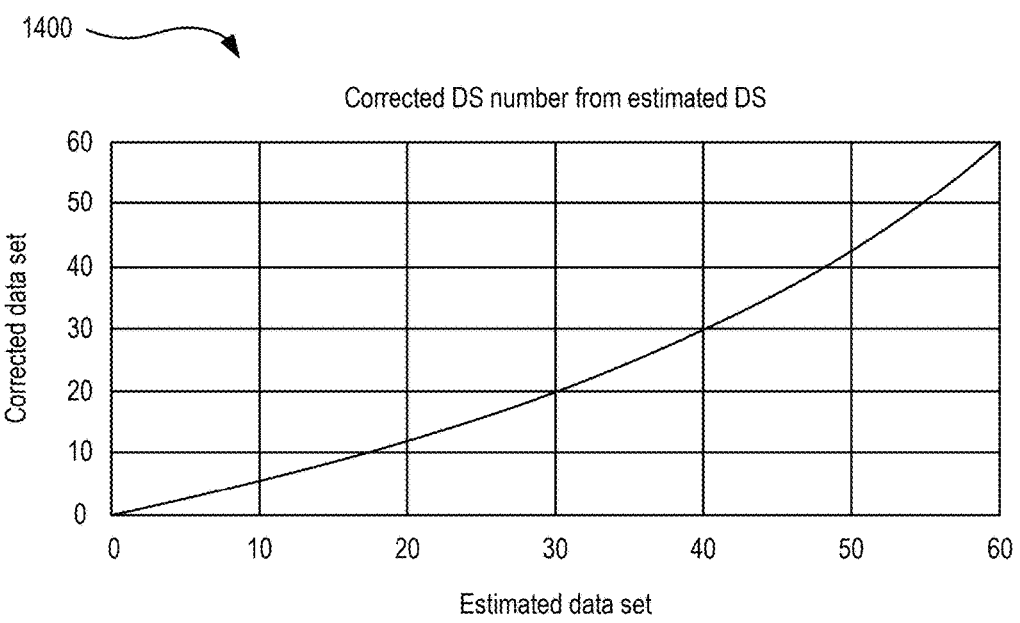
FIG. 14 is a chart showing the corrected data set number from the estimated data set number, in accordance with one embodiment.

The chart 1400 in FIG. 14 shows the position of the data set when the compression ratio changes from 2:1 to 1:1 at the record position estimated by the ratio in FIG. 13. Conversely, we can see that the 34×m$^{th}$ record from the beginning is recorded in the $24^{th}$ data set.

By using this graph (or an equivalent table), for example, if it is estimated that the position of the record calculated by ratio is recorded in the $48^{th}$ data set from the beginning, the reading should be started from the $40^{th}$ data set, which exists 8 data set positions back.

Normally, there is no target in the data set in front of the range estimated here. However, in the case of a tape with very biased data, if it is found that the target existed before the data set when reading the DSIT of the data set estimated by this method, in addition to the data set and record number at the beginning of the HRTD, the record number recorded in the DSIT of the data set read here can be used to narrow down the number of the data set to start reading, or simply read from the first data set of the HRTD.

Narrow Down the Extent to which the Data Set May be Recorded within the HRTD Region As noted above, e.g., with reference to operation 1104 of FIG. 11, a physical position range on tape is determined.

The tape drive specification specifies the linear density of a data set when writing to tape. The tape drive verifies the written COs from the write tracks by reading back from the read tracks and rewrites the unreadable COs from another write track to the tape. Also, if the state of the media is bad and the location information cannot be set correctly, the writing is interrupted until the location information is set. These requirements vary the length of the data set, but in the absence of these factors, the length of the data set is uniquely determined by the linear density. For example, the length of the data set recorded on the JF tape used in the TS1170 is 146 mm. This length is placed with $L_{DS}$.

However, if there is a rewrite or an interruption in writing the above CO, the length of the data set will be longer than 146 mm.

The HRTD records the position information at the end of the data set written at the end of the region. In the case of FIG. 12, the terminal position information of DS(i−1) and the terminal position information of DS(i+k) can be acquired. Set the distance between the two to $L_{HRTD}(n+1)$. This is the length from the beginning of the first data set recorded in HRTD(n+1) to the end of the last data set.

In the case of tape, the position information is handled in units called LPOS. The length of one LPOS, LPOS_mm, depends on the tape format. It is 5.472 mm for some conventional tapes.

In FIG. 12, when reading DS (i+j), which is the $j^{th}$ data set of the HRTD(n+1) region, the current mechanism reads data sets in order from the beginning of the HRTD(n+1) region, and when DSIT of all data sets from DS(i+1) to DS(i+j−1) is read, the tape drive starts reading the DS(i+j) for the first time. This is because the Tape Write Pass is not finalized, so the purpose is not to misread the old data set, and it is not possible to identify the data set in which the target record is recorded.

However, when the data set number to be started is determined by the mechanism of operation 1102 of FIG. 11, the range in which DS(i+j) absolutely cannot exist can be excluded from the range to be read by considering the linear density of the data set.

The end position $LPOS_{DS\_end}(i)$ of DS (i) recorded in HRTD(n) is also the write start position $LPOS_{DS\_begin}(i+1)$ of DS (i+1) at the same time. From there, DS(i+j) does not exist in the range of the length of the j−1 data set up to DS(i+j−1). From this, the $LPOS_{DS\_read\_from}(i+j)$ can give a position to start reading DS(i+j) according to the following equation.

$$LPOS_{DS\_read\_from}(i+j) = LPOS_{DS\_begin}(i+1) + \frac{L_{DS} \times (j-1)}{LPOS\_mm}$$

In addition, the end position $LPOS_{DS\_end}(i+k)$ of the last recorded data set DS(i+k) in the HRTD(n+1) region is also recorded in HRTD(n+1). From the terminal position of DS(i+k) to the position traced back by the length of the k−j data set from DS(i+j) to DS(i+k), DS(i+j) does not exist. From this, the $LPOS_{DS\_read\_to}(i+j)$ can give a position to end the reading of DS(i+j) according to the following equation.

$$LPOS_{DS_{read\_to}}(i+j) = LPOS_{DS\_end}(i+k) + \frac{L_{DS} \times (k-j)}{LPOS\_mm}$$

The length of the read range is expressed by the following equation and depends only on the length of the HRTD region and the number of data sets recorded in the HRTD area, and is constant regardless of the position of j in the target DS(i+j).

$$LPOS_{DS_{read\_to}}(i+j) - LPOS_{DS_{read\_from}}(i+j) =$$
$$LPOS_{DS_{end}}(i+k) - \frac{L_{DS} \times (k-j)}{LPOS\_mm} - \left\{ LPOS_{DS_{begin}}(i+1) + L_{DS} \times (j-1) \right\} =$$
$$LPOS_{DS_{end}}(i+k) - LPOS_{DS_{begin}}(i+1) - \frac{L_{DS} \times (k+1)}{LPOS\_mm}$$

In one example, assume that 10% of fragments fail to write and rewrite when the data set is written, resulting in an average increase in the length of the data set by 10%. In the case of TS1170, the length of the data set of 146 mm is increased to 161 mm.

Since the length of the user data area of an illustrative tape of 1287 m is divided into 128 HRTD areas, the length of the HRTD area is 10055 mm. Sixty-two 161 mm data sets can be recorded in this region.

$$i=0$$

$$LPOS_{DS\_begin}(i+1) \times LPOS\_mm = 0$$

$$LPOS_{DS\_end}(i+k) \times LPOS\_mm = 10055$$

Figure 15:
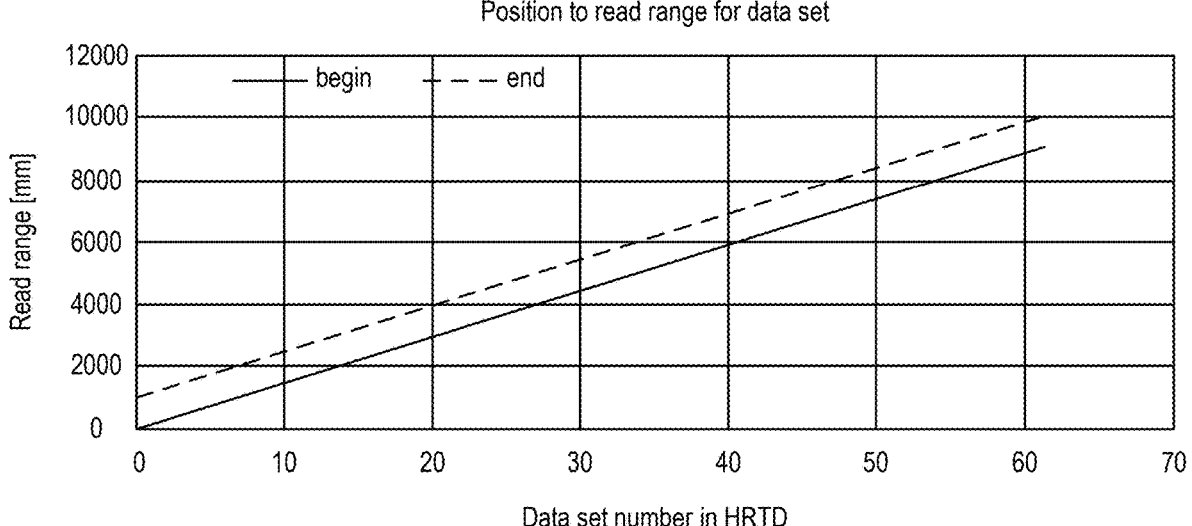
FIG. 15 is a chart showing a read range for a data set in an HRTD region, in accordance with one embodiment.

FIG. 15 shows the range from which DS(i+j) is read when j is changed from 0 to 61.

For example, when reading a data set with j=10, skimming only in the range of 1.003 m from 1.460 m to 2.463 m from the beginning of the HRTD region to confirm the Tape Write Pass, and read the data set in that range.

Further, when reading a data set of j=60, skimming only in the range of 1.003 m from 8.760 m to 9.763 m from the beginning of the HRTD region to confirm the Tape Write Pass, and read the data set in that range.

In traditional skimming, the upper limit of the length of the data set of 4 m had to be done, but this means that the length can also be reduced.

In any case, it is not necessary to read the DSIT of the data set recorded from the beginning of the HRTD region to the readout start position obtained by this mechanism.

In operation 1102 of FIG. 11, the data set number to start reading was determined in order to search for the data set in which the target record was recorded.

Further, in operation 1104 of FIG. 11, the data set to be read was calculated in which the physical position range in the HRTD including the data set to start reading exists.

If the Tape Write Pass of the data set to be read is determined, such as when the Tape Write Pass recorded in the preceding and following HRTDs is the same, the tape drive can start reading the data set to be read from the first position of the calculated range.

If the Tape Write Pass is not determined, the tape drive determines the Tape Write Pass of the data set to be skimmed within the calculated range and starts reading, and then starts reading the data set from the physical position determined by skimming.

Effects of Exemplary Disclosed Embodiments

In the mechanism that uses HRTD, the tape moves at a high speed, e.g., of 12.4 m/sec, to the boundary of the HRTD region where the target record resides, and then the speed is reduced to a read speed of 6 m/sec, and the data set is read until it finds a data set that records the target record. At this time, the Tape Write Pass of the data set to be read from the HRTD information is confirmed.

On the other hand, in the proposed mechanism, the tape moves at high speed to the beginning position of the range of the data sets that may contain the target record. When the Tape Write Pass of the data set to be read is not determined, skimming is performed within the range where the data set can exist, and the Tape Write Pass of the first data set is confirmed, and then the reading is started. When the Tape Write Pass of the data set to be read is determined, such as when the Tape Write Pass of the HRTD area where the target record resides is equal to the Tape Write Pass of the previous HRTD area, or when the Tape Write Pass of the first data set of the Wrap is one larger than the Tape Write Pass of the previous HRTD, readout can be started without skimming.

Figures 16, 17:
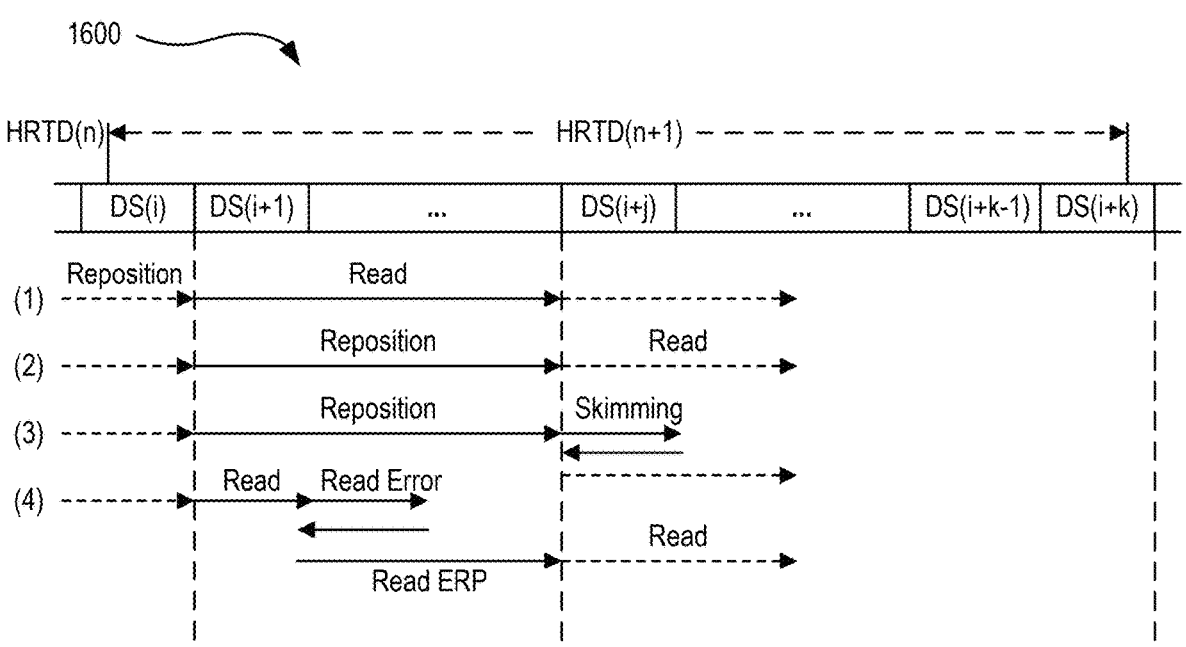
FIG. 16 is a depiction of a performance comparison for reaching a forward destination, in accordance with one embodiment.
FIG. 17 is a chart showing reposition performance for reaching the forward destination, in accordance with one embodiment.

In order to evaluate the effectiveness of the proposed mechanism, the following four cases are compared, in conjunction with FIG. 16. The time to compare is the time from reaching the first position of the first data set DS(i) in the HRTD region in which the target is located to the first position of the recorded data set DS(i+j) where the target may be recorded and starting the read.

(1) Move at high speed from the current position to the beginning of the HRTD region where the target resides and reads the data set one by one until it finds a record of the target.

(2) Move at high speed from the current position to the beginning position of DS(i+j) and start reading the data set from there.

(3) Move at high speed from the current position to the beginning position of DS(i+j), perform skimming to confirm the tape write pass, and then start reading the data set.

(4) Move at high speed from the current position to the beginning position of the HRTD region where the target exists and start reading the data sets one by one from there, but since an error occurs in the middle of the data set, it rewinds and reads again from the beginning. The drive only need to re-read it once.

If the current position is in front of the HRTD area where the target is located, the relationship will be shown in FIG. 16. The solid line in the FIG. 1600 is the part where time is compared.

The assumption here is that the length of the data set is 146 mm at a length of 10055 mm of the HRTD region, but it is 175.2 mm due to the occurrence of 20% rewrite. The high-speed movement shall be performed at 12.4 m/sec and the readout shall be performed at 6 m/sec, and it shall take 3 seconds to perform two changes of direction and 4 seconds for the Read ERP to rewind with skimming or read ERP.

The results of the comparison of operations in FIG. 16 are shown in the chart 1700 of FIG. 17. The horizontal axis is the number of data sets from the beginning in the HRTD area. The last data set in the HRTD region is the $57^{th}$ one. The vertical axis is the time from the beginning position of DS(i+1) to the start of reading at DS(i+j).

In FIG. 17, (1) is the travel time when starting from the boundary of the conventional HRTD. (2) is the case when there is a high possibility that the target exists, and the Tape Write Pass of the data set to be read is determined, it can always be moved in a shorter time than that. The farther away you are from the boundaries of HRTD, the greater the effect. However, (3) is the case when the Tape Write Pass of the data set to be read is not finalized and skimming is required, it takes 2.5 to 3.3 seconds more than (2). In the conventional mechanism of (4), when ERP occurs only once by Read, it takes 4 seconds more than (1). The time in (4) takes 0.7 to 1.3 seconds more than in the case of (3). Each ERP occurrence adds an additional 4 seconds of travel time.

Figure 18:
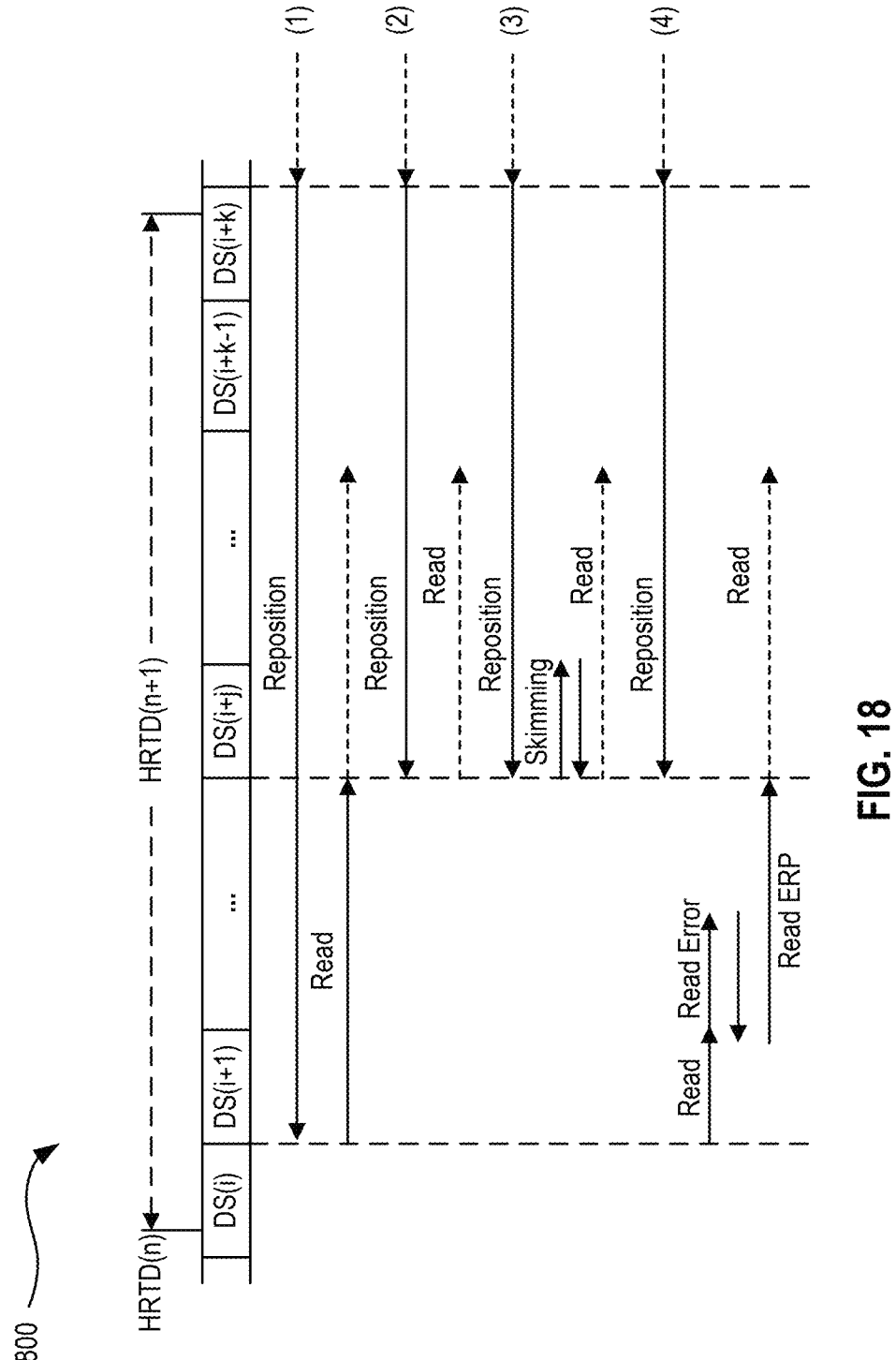
FIG. 18 is a depiction of a performance comparison for reaching a backward destination, in accordance with one embodiment.

FIG. 18 shows the case when the current position is ahead of the HRTD area where the target is located. The solid line in the FIG. 1800 is the part where time is compared.

In this case, the tape is rewound from the current position to the HRTD area where the target exists, and then the reading is started, so it moves in the opposite direction as shown in FIG. 18.

Figure 19:
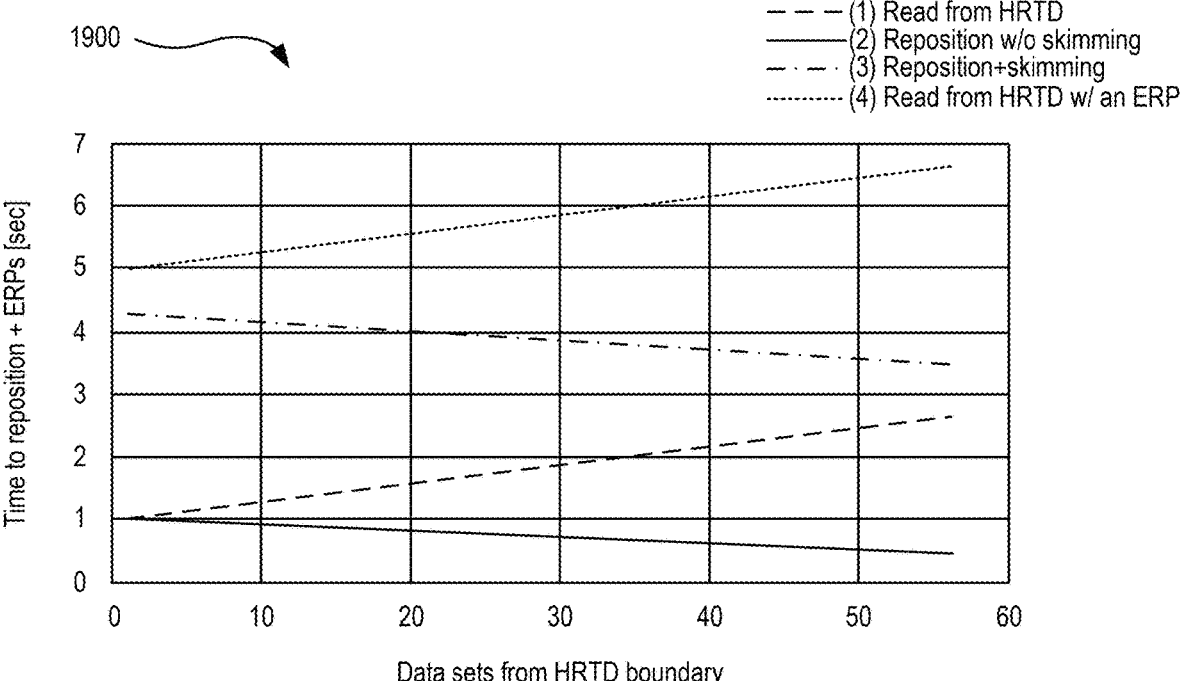
FIG. 19 is a chart showing reposition performance for reaching the backward destination, in accordance with one embodiment.

The result of comparing the time until the start of reading the first data set DS(i+j) where the target may exist at this time is shown in the chart 1900 of FIG. 19. The time being compared here is the time from the time when the tape passes the end position of the last data set DS(i+k) in the HRTD region to the start of reading DS(i+j).

In FIG. 19, (1) is the travel time when starting from the boundary of the conventional HRTD. If there is a high possibility that the target of (2) exists, and the Tape Write Pass of the data set to be read is determined, it can always be moved in a shorter time than (1). Unlike (1), which always returns to the beginning of the HRTD region before starting the readout, in (2), the farther the position of the target data set from the HRTD border, the shorter time to move to the target. When the Tape Write Pass of (3) is not finalized and skimming is required, it takes more time than (2), but the difference from (1) becomes smaller as the position of the target data set is later. In the conventional mechanism of (4), when ERP occurs only once by Read, it takes 4 seconds longer than (1). As a result, the difference increases as the position of the target data set is later than in the case of (3). Each ERP occurrence adds an additional 4 seconds of travel time.

From the above results, the method of moving to the readout start position is determined under the following conditions.

(I) If the Tape Write Pass of the data set that may be recorded by the target is determined, it is always moved by the proposed mechanism and then read is started.

(II) If the Tape Write Pass of the data set that may be recorded by the target is not determined, and the tape or drive is in good condition and it can be expected that ERP will never occur, the read will be started from the beginning of the HRTD area as before.

(III) If the Tape Write Pass of the data set that may be recorded by the target is not determined, and the condition of the tape or drive is degraded, and there is a possibility of one or more ERP occurrences, move it by the proposed mechanism and start reading.

When the Tape Write Pass of HRTD(n) and HRTD(n+1) match, the Tape Write Pass is confirmed, and the move and read are performed by the method described in (I). Normally, most HRTDs have the same Tape Write Pass, so this method is chosen.

When the Tape Write Pass of HRTD(n) and HRTD(n+1) do not match, the Tape Write Pass is not confirmed, so move and read according to method (II). However, if ERP has been repeatedly generated in the previous read, there is a high possibility that ERP will occur one or more times, so move and read according to the method (III).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

narrowing down a number of data sets to be searched in an HRTD (High Resolution Tape Directory) area for a target record based at least in part on a ratio of:

a number of records from a beginning of the HRTD area to the target record, and a total number of records in the HRTD area having the target record;

calculating a physical position range in the HRTD area where the narrowed number of data sets physically exist based on a linear density of a tape drive specification;

repositioning a magnetic tape having the HRTD area to a starting data set in the calculated physical position range; and reading the narrowed range of data sets starting at the starting data set.

2. A method as recited in claim 1, wherein the narrowing down of the number of data sets to be searched in the HRTD area is further based on a total number of data sets in the HRTD area.

3. A method as recited in claim 1, wherein the narrowing down of the number of data sets to be searched in the HRTD area is further based on a compression ratio of data written in the HRTD area.

4. A method as recited in claim 1, comprising selecting a first data set in the calculated physical position range as the starting data set in response to determining a tape write pass value of the data sets in the narrowed range is known.

5. A method as recited in claim 1, comprising performing skimming in the calculated range to determining a tape write pass value of the data sets in the narrowed range; and selecting the starting data set based on the skimming.

6. A method as recited in claim 1, wherein the starting data set is calculated using the following equation:

$$DS_{start} =$$

$$DS_{HRTD(n)} + \frac{R_{target} - R_{HRTD(n)}}{R_{HRTD(n+1)} - R_{HRTD(n)}} \times \{DS_{HRTD(n+1)} - DS_{HRTD(n)}\} - DS_{margin}$$

where:

$DS_{start}$ is the starting data set, $DS_{HRTD(n)}$ is a first data set in the HRTD, $R_{target}$ is a number of the target record, $R_{HRTD(n)}$ is a first record number in the HRTD, $R_{HRTD(n+1)}$ is a first record number in a next HRTD, $DS_{HRTD(n+1)}$ is a first data set in the next HRTD, and $DS_{margin}$ is an adjustment factor based on a compression ratio of data written in the HRTD area.

7. A method as recited in claim 1, wherein calculating the physical position range in the HRTD area where the data sets in the narrowed number of data sets physically exist includes determining where the data sets in the narrowed number of data sets were not able to be written.

8. A method as recited in claim 7, wherein the physical range is outside the area where the data set was not able to be written, wherein the reading begins at a location in the physical range closest to the beginning of the HRTD area, wherein the reading ends at a position within the physical range farthest from the beginning of the HRTD area.

9. A method as recited in claim 1, wherein the method is performed by a tape drive.

10. A computer program product comprising:

one or more computer readable storage media; and program instructions stored on the one or more storage media to perform operations comprising:

narrowing down a number of data sets to be searched in an HRTD (High Resolution Tape Directory) area for a target record based at least in part on a ratio of:

a number of records from a beginning of the HRTD area to the target record, and a total number of records in the HRTD area having the target record;

calculating a physical position range in the HRTD area where the narrowed number of data sets physically exist based on a linear density of a tape drive specification;

repositioning a magnetic tape having the HRTD area to a starting data set in the calculated physical position range; and reading the narrowed range of data sets starting at the starting data set.

11. A computer program product as recited in claim 10, wherein the narrowing down of the number of data sets to be searched in the HRTD area is further based on a total number of data sets in the HRTD area.

12. A computer program product as recited in claim 10, wherein the narrowing down of the number of data sets to be searched in the HRTD area is further based on a compression ratio of data written in the HRTD area.

13. A computer program product as recited in claim 10, comprising selecting a first data set in the calculated physical position range as the starting data set in response to determining a tape write pass value of the data sets in the narrowed range is known.

14. A computer program product as recited in claim 10, comprising performing skimming in the calculated range to determining a tape write pass value of the data sets in the narrowed range; and selecting the starting data set based on the skimming.

15. A computer program product as recited in claim 10, wherein the starting data set is calculated using the following equation:

$$DS_{start} =$$

$$DS_{HRTD(n)} + \frac{R_{target} - R_{HRTD(n)}}{R_{HRTD(n+1)} - R_{HRTD(n)}} \times \{DS_{HRTD(n+1)} - DS_{HRTD(n)}\} - DS_{margin}$$

where:

$DS_{start}$ is the starting data set, $DS_{HRTD(n)}$ is a first data set in the HRTD, $R_{target}$ is a number of the target record, $R_{HRTD(n)}$ is a first record number in the HRTD, $R_{HRTD(n+1)}$ is a first record number in a next HRTD, $DS_{HRTD(n+1)}$ is a first data set in the next HRTD, and $DS_{margin}$ is an adjustment factor based on a compression ratio of data written in the HRTD area.

16. A computer program product as recited in claim 10, wherein calculating the physical position range in the HRTD area where the data sets in the narrowed number of data sets physically exist includes determining where the data sets in the narrowed number of data sets were not able to be written.

17. A computer program product as recited in claim 16, wherein the physical range is outside the area where the data set was not able to be written, wherein the reading begins at a location in the physical range closest to the beginning of the HRTD area, wherein the reading ends at a position within the physical range farthest from the beginning of the HRTD area.

18. An apparatus, comprising:

a controller configured to perform operations comprising:

narrowing down a number of data sets to be searched in an HRTD (High Resolution Tape Directory) area for a target record based at least in part on a ratio of:

a number of records from a beginning of the HRTD area to the target record, and a total number of records in the HRTD area having the target record, calculating a physical position range in the HRTD area where the narrowed number of data sets physically exist based on a linear density of a tape drive specification, repositioning a magnetic tape having the HRTD area to a starting data set in the calculated physical position range, and reading the narrowed range of data sets starting at the starting data set; and a drive mechanism for passing the tape over a magnetic head.

19. An apparatus as recited in claim 18, wherein the narrowing down of the number of data sets to be searched in the HRTD area is further based on a compression ratio of data written in the HRTD area.

20. An apparatus as recited in claim 18, wherein calculating the physical position range in the HRTD area where the data sets in the narrowed number of data sets physically exist includes determining where the data sets in the narrowed number of data sets were not able to be written.

* * * * *